United States Patent
Moriyama et al.

(10) Patent No.: US 8,845,438 B2
(45) Date of Patent: Sep. 30, 2014

(54) YOKE FOR A CROSS TYPE UNIVERSAL JOINT AND MANUFACTURING METHOD THEREOF

(75) Inventors: Seiichi Moriyama, Maebashi (JP); Tatsunori Mita, Maebashi (JP); Taishi Shigeta, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/059,123

(22) PCT Filed: Feb. 1, 2011

(86) PCT No.: PCT/JP2011/051998
§ 371 (c)(1),
(2), (4) Date: Sep. 27, 2012

(87) PCT Pub. No.: WO2011/102212
PCT Pub. Date: Aug. 25, 2011

(65) Prior Publication Data
US 2013/0017892 A1    Jan. 17, 2013

(30) Foreign Application Priority Data

Feb. 17, 2010 (JP) .................. 2010-032555
Apr. 1, 2010 (JP) .................. 2010-084881
Jul. 15, 2010 (JP) .................. 2010-160673
Dec. 21, 2010 (JP) .................. 2010-284192

(51) Int. Cl.
*F16D 1/072* (2006.01)
*F16D 3/38* (2006.01)
*B62D 1/20* (2006.01)
*B62D 1/16* (2006.01)
*F16D 1/08* (2006.01)

(52) U.S. Cl.
CPC ............ *F16D 3/387* (2013.01); *F16D 2250/00* (2013.01); *B62D 1/20* (2013.01); *B62D 1/16* (2013.01); *F16D 1/0864* (2013.01)
USPC .......................... 464/134; 403/236; 72/379.2

(58) Field of Classification Search
USPC ............. 464/134, 135, 182; 403/236; 29/438, 29/DIG. 3, DIG. 37, DIG. 42; 72/379.2, 72/713, 714
See application file for complete search history.

(56) References Cited

U.S. PATENT DOCUMENTS 2,067,283 A * 1/1937 Padgett .................. 464/134
4,505,608 A * 3/1985 Haldric ................... 72/379.2 X
5,580,180 A * 12/1996 DeBisschop et al. .... 72/379.2 X

FOREIGN PATENT DOCUMENTS

JP    7-88859 B2    9/1995
JP    8-284968 A    11/1996

(Continued)

OTHER PUBLICATIONS

Japanese-language International Search Report dated Mar. 15, 2011 including partial English-language translation (Seven (7) pages).

*Primary Examiner* — Gregory Binda
(74) *Attorney, Agent, or Firm* — Crowell & Moring LLP

(57) ABSTRACT

A yoke is provided in which damage such as bending of a bolt for joining and fastening the base section of the yoke to the end section of a rotating shaft does not easily occur even when that bolt is excessively tightened. In the present invention, a force is applied to both a first flange section and a second flange section in a direction toward each other, and with the inner diameter of the base section elastically reduced, a through hole, screw hole and seating surface section are formed. After that, the force is released and the inner diameter of the base section expands by its own elastic force. Alternatively, with the inner diameter of the base section reduced, the through hole, screw hole and seating surface section are formed, after which the first flange section and second flange section are plastically deformed in the direction away from each other to expand the inner diameter of the base section.

9 Claims, 13 Drawing Sheets

(56) References Cited

FOREIGN PATENT DOCUMENTS

| JP | 10-2343 A | 1/1998 |
| JP | 10-148217 A | 6/1998 |
| JP | 2000-320564 A | 11/2000 |
| JP | 2004-223616 A | 8/2004 |
| JP | 2008-298267 A | 12/2008 |
| JP | 2009-8174 A | 1/2009 |
| JP | 2009-210012 A | 9/2009 |

* cited by examiner (A)

(B)

(A)

(B)

(A)

(B)

PRIOR ART

PRIOR ART

PRIOR ART

PRIOR ART

PRIOR ART

PRIOR ART

YOKE FOR A CROSS TYPE UNIVERSAL JOINT AND MANUFACTURING METHOD THEREOF

TECHNICAL FIELD

The present invention relates to the yoke of a cross type universal joint (Cardan joint) that is used for connecting a pair of rotating shafts of an automobile steering apparatus so that torque can be freely transmitted, and to the improvement of the manufacturing method thereof.

RELATED ART

An automobile steering apparatus is constructed as illustrated in FIG. 8, and transmits the rotation of a steering wheel 1 to an input shaft 3 of a steering gear unit 2, and as this input shaft 3 rotates, a pair of left and right tie rods 4 are pushed or pulled, which applies a steering angle to the front wheels. In order for this, the steering wheel 1 is fastened to and supported by the rear-end section of a steering shaft 5, the front-end section of this steering shaft 5 is connected to the rear-end section of an intermediate shaft 8, and the front-end section of this intermediate shaft 8 is connected to the input shaft 3. The example in the figure is an electric-powered power steering apparatus comprising an assist apparatus 10 having an electric motor as an auxiliary power source, with the front-end section of the steering shaft 5 being connected to the input side of the assist apparatus 10, and the output shaft of the assist apparatus 10 being connected to the rear-end section of the intermediate shaft 8.

Normally, the steering shaft 5, the intermediate shaft 8 and the input shaft 3 are rotating shafts 20a, 20b (steering shaft 5 and intermediate shaft 8, or intermediate shaft 8 and input shaft 3) that are not on the same line as each other, so they shafts are mutually connected via universal joints 7, 9. A cross type universal joint having a yoke assembled therein is used as these universal joints 7, 9, and as disclosed in Patent Documents 1 to 7, the various construction for this kind of cross universal joint is known.

FIG. 9 illustrates one example of conventional construction as disclosed in Patent Document 1. The universal joint 11 illustrated in FIG. 9 is constructed such that a pair of yokes 12a, 12b is joined by way of one joint cross 13 such that torque can be freely transmitted. In this example of conventional construction, both yokes 12a, 12b are made by punching and bending metal plate such as steel plate with a press, and comprise base sections 14a, 14b and a pair of joint arms 15a, 15b for each of the yokes 12a, 12b.

First flange section sections 16a, 16b and second flange sections 17a, 17b are formed around the base sections, 14a, 14b, respectively with non-continuous sections 18a, 18b that are formed in one location in the circumferential direction of the base sections 14a, 14b located in between. A pair of fastening holes are formed per yoke at positions of each of the first and second flange sections 16a, 17a, 16b, 17b of the base sections 14a, 14b, the positions being in alignment with each other, in a direction that in a twisted positional relationship with respect to the axial direction of the base sections 14a, 14b. Moreover, seating surface sections 19a, 19b are formed on the outside surface of the first flange sections 16a, 16b in the portions that surround the opening sections of the fastening holes that are formed in the first flange sections 16a, 16b, in directions that are orthogonal to the center axes of the fastening holes.

The pair of joint arm sections 15a, 15b are formed on the tip end sections of the base sections 14a, 14b at two locations on opposite sides in the radial direction from the rotating shafts 20a, 20b that are joined and fastened to the base sections 14a, 14b, and are such that they extend in the axial direction. Circular holes 21a, 21b are formed in the tip end sections of each of the joint arm sections 15a, 15b such that there are concentric with each other. Four shaft sections that are formed in the joint cross 13 are supported on the inside of the circular holes 21a, 21b by radial bearings 22a, 22b, which are drawn cup needle bearings, such that they rotate freely. With such construction, the yokes 12a, 12b are combined such that torque can be transmitted even when the center axes of the yokes are at an angle.

When assembling this kind of automobile steering apparatus, the end sections of both rotating shafts 20a, 20b fit inside the base sections 14a, 14b of the yokes 12a, 12b, and further, by tightly screwing nuts 24a, 24b onto bolts 23a, 23b that have been inserted through the fastening holes in these base sections 14a, 14b, the inner peripheral surfaces of the base sections 14a, 14b strongly press against the outer peripheral surfaces on the end sections of the rotating shafts 20a, 20b.

In the example in the figure, of the pair of yokes 12a, 12b, one of the yokes 12b (left yoke in FIG. 9) is capable of transmitting large torque between the base section 15b and the rotating shaft 20b by female serrations that are formed around the inner peripheral surface of the base section 14b engaging with male serrations that are formed around the outer peripheral surface of the end section of the rotating shaft 20b. In this case, the base section 14b and rotating shaft 20b are joined together by relative displacement in the axial direction of the parts. On the other hand, the base section 14a of the other yoke 12a (right yoke in FIG. 9) is a horizontal insertion type yoke having U-shaped cross section, such that the rotating shaft 20 can be inserted from the side into the base section 14a of the yoke 12a.

As illustrated in FIGS. 10 and 11, construction is also known (see Patent Documents 3 and 5 to 7) in which the nuts are omitted, and of the pair of fastening holes that are formed at positions of both flange sections 16c, 17c which aligned with each other, one of the fastening holes is a through hole 25 through which a bolt 23c is loosely inserted, and the other fastening hole is a screw hole 26 for screwing the bolt 23c into.

The yoke 12c is a pressed yoke that is formed by sequentially performing punching and bending of metal plate using a press, and the first flange section 16c and second flange section 17c are bent such as to have the thickness of two metal plates. Moreover, female serrations 44 are formed around the inner peripheral surface of the base section 14c except in near the non-continuous section 18c.

The construction and manufacturing method of this kind of pressed yoke as well is known (see Patent Document 7). First, by punching the metal plate with a press, a flat plate 20 comprising a base plate section 28 and a pair of tongue-shaped sections 29 is obtained as illustrated in FIG. 12(A). Next, both end sections of the base plate section 28 are bent 180° in the narrow width sections 31 to form the first intermediate plate member 32 illustrated in FIG. 12(B). Next, this first intermediate plate member 32 is pressed and plastically deformed between a pair of dies, to form the second intermediate member 33 illustrated in FIG. 12(C). The tongue-shaped sections 29 of this second intermediate member 33 are bent into a partial cylindrical shape, and the portions near the base ends of these tongue-shaped sections 29 are bent into a crank shape such that the portions from the middle section toward the tip end second of these tongue-shaped sections 29 are offset from the base plate section 28.

Next, the center portion of the base plate section 28 is bent from the flat plate state more than 90° and less than 180°, for example, between 130° to 150°, to form the third intermediate member 34 illustrated in FIG. 12(D). Next, the base plate section 28 is further bent from the flat plate state up to about 180° to form the fourth intermediate member 35 illustrated in FIG. 12(E). In this state, the base section 14c and pair of joint arm sections 15b are formed. Finally, through hole 25 and screw hole 26 are formed in both flange sections 16c, 17c, female serrations 44 are formed around the inner peripheral surface of the base section 14c and circular holes 21b are formed in both joint arm sections 15b to complete the yoke 12c as illustrated in FIGS. 10 and 11.

With this kind of construction, in the case of a yoke 12c that is made as described above, in either the state of the bolt 23c not being attached as illustrated in FIG. 11(A), or the state of the bolt 23c being attached as illustrated in FIG. 11(B), the rotating shaft 20c is inserted into the base section 14c, and as long as the bolt 23c is not tightened, the through hole 25 and screw hole 26 are concentric.

In either type of yoke 12a to 12c, as the bolt 23a to 23c is tightened, the space between the first flange section 16a to 16c and second flange section 17a to 17c is reduced. When this happens, due to the existence of the rotating shaft 20a to 20c, the amount of elastic deformation of each flange section 16a to 16c, 17a to 17c becomes larger near the tip end (side furthest from the rotating shaft 20a to 20c) having low rigidity than near the base end (side closest to the rotating shaft 20a to 20c) having high rigidity. In other words, the space between the first flange section 16a to 16c and the second flange section 17a to 17c becomes wide toward the base end and become narrow toward the tip end side.

As a result, in addition to the seating surface sections 19a to 19c shifting in the direction orthogonal to the center axis of the fastening holes, the center axes of the fastening holes through which the bolt 23a to 23c is inserted or screwed into are both at angles to each other. In this state, force is applied in the bending direction of the bolt 23a to 23c, and this force becomes larger the tighter the bolt 23a to 23c is fastened. Particularly, as illustrated in FIGS. 10 and 11, in the case construction in which the base section 14c and end section of the rotating shaft 20c are fastened by a serration fit, and the bolt 23c is screwed into the screw hole that is formed in the second flange section 17c, the distance between the head section 36 of the bolt 23c and screw hole 26 is short. Therefore, as the bolt 23c is tightened, part of the bolt 23c tends to bend with relatively large curvature. As the tightening force of the bolt 23c becomes excessive, bending of the bolt 23c becomes large, and there is a possibility that the durability of the bolt will be compromised.

In order to ease such bending of the bolt 23c, construction is known, such as disclosed in Patent Document 1, in which the space between the tip end sections of the pair of flange sections is prevented from becoming excessively narrow, or such as disclosed in Patent Documents 5 and 6, in which, the seating surface section that comes in contact with the inside surface of the head section of the bolt is formed at an angle beforehand, or taking into consideration the elastic deformation that occurs as the bolt is tightened, the fastening holes formed in the pair of flange sections are formed at angles beforehand.

FIG. 13 illustrates the conventional construction disclosed in Patent Document 5. This yoke is made of metal and formed by metal forming through forging such that in the state before use, the through hole 38 and screw hole 39 are concentric with each other. The seating surface section 40 is angled with respect to both holes 38, 39, and the inner diameter of the through hole 38 is sufficiently larger than the outer diameter of the bolt 23b. With this construction, in the state during use as illustrated in FIGS. 13C, 13D, the seating surface section 40 is such that it is in a direction that is orthogonal to the center axis of the bolt 23b that is screwed into the screw hole 39, such that application of a large force in the bending direction of the bolt 23b is prevented. However, even though it is possible to maintain the durability of the bolt 23b, processing is troublesome and an increase in cost is unavoidable.

Moreover, as described above, in recent years, column assist type electric-powered power steering apparatuses having an assist apparatus 10 for providing auxiliary steering force to the steering shaft 5 located between the intermediate shaft 8 and the steering wheel 1 are becoming widely used.

In construction that uses this kind of electric-power power steering apparatus, the rotation torque that is loaded on the intermediate shaft 8 becomes large, so the rigidity of the universal joint 7, and particularly the rigidity of the joint arm sections 15a, 15b that are around the circular holes 21a, 21b, which are bearing holes for allowing pivoting of the joint cross 13, must be made large.

In Patent Document 9, on the outside in the radial direction of the joint arm sections 15a, 15b, burring is performed around the circular holes 21a, 21b causing the cylindrical shaped build up to protrude out, and the surface area of the inner wall of the circular holes 21a, 21b that allow pivoting of the bearing is enlarged, thus increasing the rigidity of the joint arm sections 15a, 15b surrounding the circular holes 21a, 21b.

However, in the universal joint section disclosed in Patent Document 1, the thickness of the cylindrical build up is thin, so as the load applied to the universal joint 7 becomes large, this cylindrical build up plastically deforms, so there is a possibility that the rigidity of the joint arm sections 15a, 15b surrounding the circular holes 21a, 21b will decrease.

RELATED ART DOCUMENTS

Patent Documents

[Patent Document 1] Japanese Patent Application Publication No. H8-284968
[Patent Document 2] Japanese Patent Application Publication No. H10-2343
[Patent Document 3] Japanese Patent Application Publication No. 2000-320564
[Patent Document 4] Japanese Patent Application Publication No. 2004-223616
[Patent Document 5] Japanese Patent Application Publication No. 2008-298267
[Patent Document 6] Japanese Patent Application Publication No. 2009-8174
[Patent Document 7] Japanese Examined Patent Application Publication No. H7-88859
[Patent Document 8] Japanese Patent Application Publication No. 2009-210012
[Patent Document 9] Japanese Patent Application Publication No. H10-148217

SUMMARY OF THE INVENTION

Problems to be Solved by the Invention

Considering the above situation, the object of the present invention is to provide a yoke comprising construction that makes it difficult for damage, such as bending or breakage, to occur in a bolt that joins and fastens the base end section of the yoke with the end section of a rotating shaft even when the bolt is tightened excessively, and to provide a method for easily manufacturing such a yoke.

Moreover, another object of the present invention is to provide a yoke having increased rigidity in joint arm sections thereof that surround circular holes (bearing holes) for allowing pivoting of a joint cross, such that the yoke is capable of supporting large loads that are applied to a universal joint.

Means for Solving the Problems

The cross type universal joint in which the yoke of the present invention is assembled, as in the case of a conventional cross type universal joint, comprises a pair of yokes, and one joint cross that joins that pair of yokes so that they pivot freely.

Each yoke of the pair comprises a base section for joining and fastening the end section of a rotating shaft, a pair of joint arm sections that extend from one end section in the axial direction of the base section at two locations on opposing sides in the radial direction with respect to the rotating shaft, and a pair of circular holes that are formed in the tip end sections of the pair of joint arm sections.

When the cross type universal joint is in use, four shaft sections that are provided in the joint cross such that they are orthogonal to each other, are supported inside the pair of circular holes in the pair of yokes by way of bearings such that they rotate freely.

The base section of at least one of the yokes of the pair of yokes is a partial cylinder having a non-continuous section at one location in the circumferential direction, and comprises a first flange section and second flange section located on both sides of the non-continuous section, a through hole that is formed in the first flange section at a twisted position with respect to the center axis of the base section, a screw hole that is formed in the second flange section in a position that coincides with the through hole, and a seating surface section that is formed in the outside surface of the first flange section in the portion that surrounds the opening section of the through hole.

When the cross type universal joint is in use, a bolt is inserted through the through hole and screwed into the screw hole, and while holding the outer peripheral surface of the rotating shaft that is inserted inside the base section, the base section of the yoke comprising the non-continuous section is joined and fastened to the end section of the rotating shaft.

Particularly, the yoke for a cross type universal joint of the present invention is formed just that the seating surface section is in an orthogonal direction with respect to the through hole. The center axis of the through hole and the center axis of the screw hole are angled with respect to each other when the width of the non-continuous section is expanded to a dimension at which the end section of the rotating shaft can be inserted inside the base section. On the other hand, the center axes of the through hole and screw hole tend to be aligned with each other when the width of the non-continuous section is reduce to a dimension at which the base section and end section of the rotating shaft can be fastened. In other words, in order that harmful bending does not occur in the bolt that is inserted through the through hole, screwed into the screw hole and further tightened, the center axis of the through hole and the center hole of the screw hole are such that they essentially coincide.

In the case of the embodying the yoke for a cross type universal joint of the present invention, preferably the center axis of the pair of circular holes that are formed in the tip end sections of the pair of joint arm sections are angled with respect to each other when the width of the non-continuous section is expanded to a dimension at which the end section of the rotating shaft can be inserted inside the base section. In addition, the center axes of the pair of circular holes tend to become aligned with each other when the width of the non-continuous section is reduced to a dimension at which the base section and end section of the rotating shaft can be fastened.

Moreover, when female serrations are formed around the inner peripheral surface of the base section and fit with male serration that are formed around the outer peripheral surface of the end section of the rotating shaft, preferably when the width of the non-continuous section is expanded to a dimension at which the end section of the rotating shaft can be inserted inside the base section, the pitch circle diameter of the female serrations is larger than the pitch circle diameter of the male serrations. Furthermore, when the width of the non-continuous section is reduced to a dimension at which the base section and end section of the rotating shaft can be fastened, the pitch circle diameter of the female serrations tends to become the same as the pitch circle diameter of the male serrations, or tends to become a specified amount (for example, 10 to 200 µm) smaller than the pitch circle diameter of the male serrations.

On the other hand, the manufacturing method for manufacturing the yoke for a cross type universal joint of the present invention, with the width of the non-continuous section located between the first flange section and the second flange section reduced to a dimension at which the base section and the end section of the rotating shaft can be fastened, or in other words, reduced such that the end section of the rotating shaft that is inserted inside the base section is held with sufficient strength, forms the through hole in the first flange section and the screw hole in the second flange section so that the holes are concentric with each other, and forms the seating surface section in the portion on the outside surface of the first flange that surrounds the through hole such that the seating surface section is orthogonal to the center axis of the through hole. After that, expands the width of the non-continuous section and expands the inner diameter of the base section to a size at which the end section of the rotating shaft can be loosely inserted.

In the case of performing the manufacturing method for manufacturing the yoke for a cross type universal joint of the present invention, preferably a force is applied to both the first flange section and second flange section in a direction toward each other, and with the inner diameter of the base section elastically reduced, the through hole, screw hole and seating surface section are formed. After that, the force applied to both flange sections is released so that the inner diameter of the base section expands by the base section's own elastic force.

Furthermore, in this case, preferably, with a support shaft having the same shape and dimension as the end section of the rotating shaft fitted inside the base section, the force is applied to both flange sections in a direction toward each other, and then with the inside diameter elastically reduced, the through hole, screw hole and seating surface section are formed.

Alternatively, with the inner diameter of the base section being reduced without specially applying an external force, the through hole, screw hole and seating surface section are formed. After that, by pressing a wedge shaped jig in between both flange sections, both of the flange sections are plastically deformed in a direction away from each other to expand the inner diameter of the base section.

In addition, in the case of performing the method for manufacturing the yoke for a cross type universal joint of the present invention, preferably, the method is performed with the width of the non-continuous section reduced to a diameter at which the base section and end section of the rotating shaft can be fastened. In this state, the pair of circular holes is formed in the tip end sections of the pair of joint arm sections such that the holes are concentric with each other.

Moreover, in the case of performing the method for manufacturing the yoke for a cross type universal joint of the present invention, in the case of a yoke having female serrations formed around the inner peripheral surface of the base section that fit with male serrations that are formed around the outer peripheral surface of the end section of the rotating shaft, preferably the method is performed with the width of the non-continuous section reduced to a dimension at which the base section and the end section of the rotating shaft can be fastened. In this state, the female serrations are formed around the inner peripheral surface of the base section such that the pitch circle diameter of the female serrations is the same as the pitch circle diameter of the male serrations, or is a specified amount (for example 10 to 200 μm) smaller than the pitch circle diameter of the male serrations.

Furthermore, in the preferred embodiment of the yoke for a cross type universal joint and manufacturing method of the present invention, the surface on the outside in the radial direction of the pair of joint arm sections is pressed toward the inside in the radial direction to work harden the edge around the pair of circular holes. This hardening is preferably performed by burnishing.

Advantageous Effect of the Invention

With the yoke for a cross type universal joint of the present invention, during use, the seating surface section becomes located in a direction nearly orthogonal to the center axis of a bolt that is fastened by way of a through hole and screw hole and tightened, and it is possible to prevent large forces in the bending direction of the bolt.

Particularly, in the present invention, when manufacturing the yoke for a cross type universal joint having the construction described above, forming of the through hole, screw hole and seating surface section in both flange sections can be performed easily at the same time. Therefore, construction that makes it possible to ease bending or breakage of the bolt as the bolt is tightened can be obtained at low cost.

In a preferred embodiment of the present invention, during use, the center axes of both circular holes that are formed in the tip end sections of both joint arm sections nearly coincide with each other, so it is possible for both of these circular holes and the two shaft sections of the joint cross that are placed inside these circular holes to have good concentricity. With this construction, it is possible to maintain a good state of rolling contact between the rolling surfaces of needles and the raceway surfaces of drawn cup needle bearings that support these shafts so that they rotate freely, so together with increasing the life of the bearings, it is possible to enable smooth operation of transmitting rotation by the cross type universal joint.

In a preferred embodiment of the present invention, during use, the adhesion between the female serrations that are formed around the inner peripheral surface of the base section and the male serrations that are formed around the outer peripheral surface of the end section of the rotating shaft can be increased uniformly overall, so it is possible to sufficiently maintain a bonding force between the base section and the end section of the rotating shaft.

Furthermore, in a preferred embodiment of the present invention, the outside surface in the radial direction of the pair of joint arm sections is pressed toward the inside in the radial direction to perform work hardening of the edge around the circular holes, which are bearing holes. Therefore, the rigidity of the edges around the circular holes of the pair of arm sections becomes large, so it is possible to support large forces that are applied to the universal joint. Moreover, by work hardening inner peripheral surface of the circular holes by burnishing, the roundness and surface roughness of the inner peripheral surface of the circular holes is improved and the durability and precision of the universal joint is further improved.

BRIEF DESCRIPTION OF THE DRAWINGS

FIG. 1(A) illustrates the state in which the inner diameter of the base section is reduced, and FIG. 1(B) illustrates the state in which the inner diameter of the base section is increased.

FIG. 2(A) illustrates the state before the rotating shaft and bolt have been assembled in the yoke, and FIG. 2(B) illustrates the state after the rotating shaft and bolt have been assembled.

FIG. 3(A) illustrates the state in which the inner diameter of the base section is reduced, and FIG. 3(B) illustrates the state in which the inner diameter of the base section is increased.

FIG. 5(A) is a side view illustrating the state in which the inner diameter of the base section is reduced and circular holes have been formed on the tip end sections of both joint arm sections, and FIG. 5(B) is a diagram as seen from above with part cut away.

FIG. 6(A) illustrates the state in which the inner diameter of the base section is reduced, and a through hole, screw hole and seating surface section have been formed, and FIG. 6(B) illustrates female serrations that are formed around the inner peripheral surface of the base section.

FIG. 7(A) is a front view and FIG. 7(B) is a right side view.

FIG. 11(A) illustrates the state after the rotating shaft has been inserted and before the bolt has been fastened, and FIG. 11(B) illustrates the stat after the bolt has been fastened.

FIG. 13(A) is a side view and FIG. 13(B) is a cross-sectional view illustrating the state before the bolt has been fastened, and FIG. 13(C) is a side view and FIG. 13(D) is a cross-sectional view illustrating the state after the bolt has been fastened.

EMBODIMENTS OF THE PRESENT INVENTION

Example 1

Figure 1:
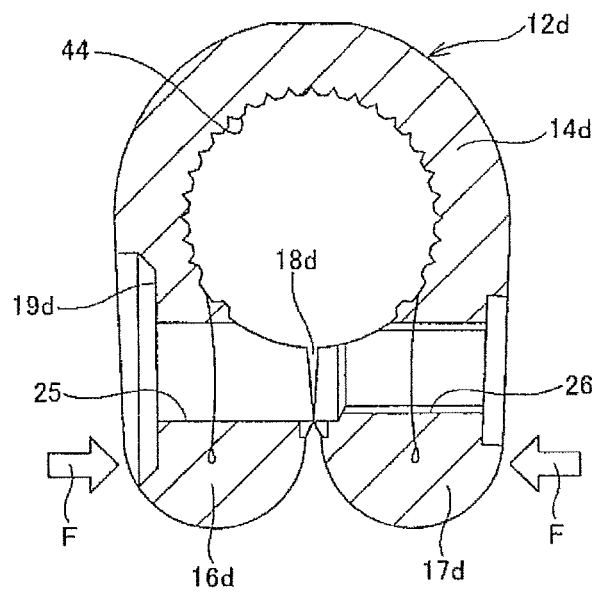
FIGS. 1(A) and 1(B) are diagrams of a first example of the present invention and correspond to cross-section I-I in FIG. 9, where
Figure 1:
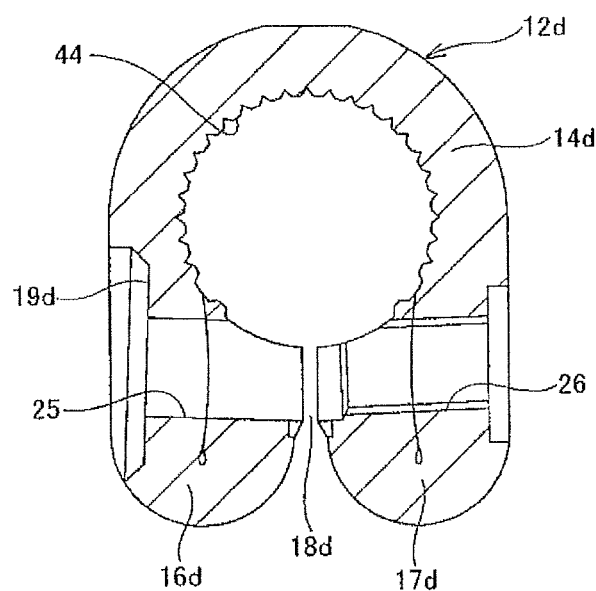

FIGS. 1(A) to 2(B) illustrate a first example of the present invention. Common features of the present invention, including this example, are construction making it possible to ease the force in the bending direction that is applied to the bolt 23c even though there is elastic deformation of the first flange section 16d and second flange section 17d that occurs as the bolt 23c is tightened, and also the manufacturing method for obtaining such construction.

More specifically, in regards to the construction of the yoke 12d, with the bolt 23c inserted through the through hole 25, screwed into the screw hole 26 and further tightened, the inside surface of the head section of this bolt 23 and the seating surface section 19d are kept parallel.

Moreover, in regards to the method of manufacturing the yoke 12d, the process of forming the through hole 25, screw hole 26 and seating surface section 19d in the first flange section 16d and second flange section 17d is devised such that the construction described above can be easily obtained.

Figure 9:
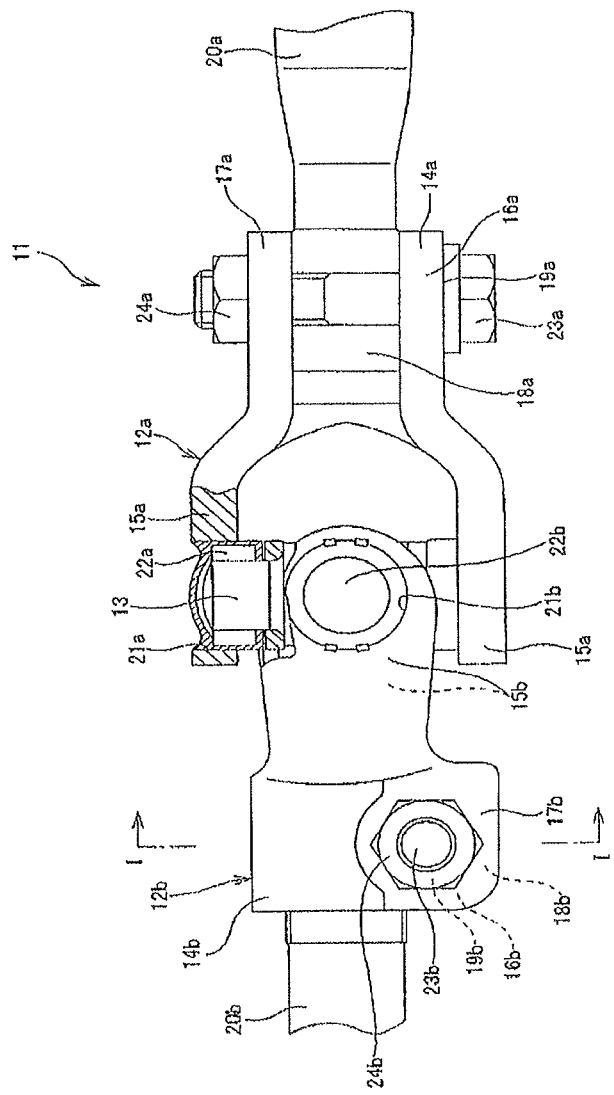
FIG. 9 is a partial cross-sectional side view illustrating an example of a conventional cross universal joint.
Figure 10:
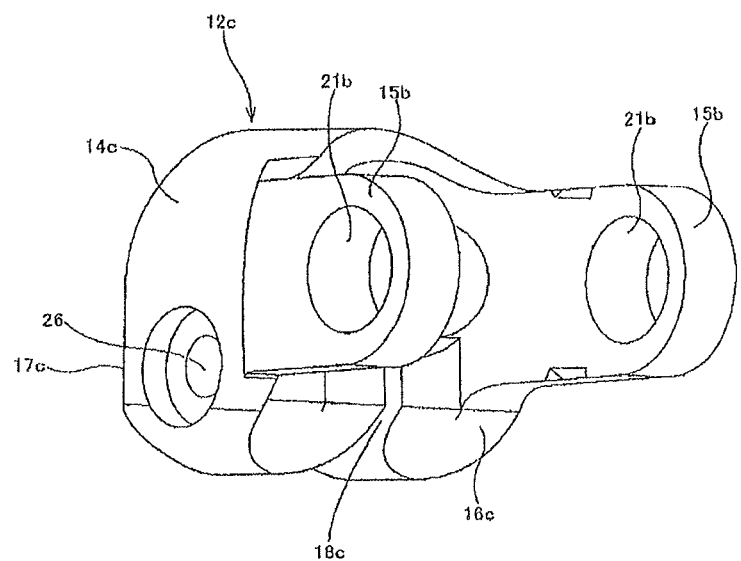
FIG. 10 is a perspective view of a second example of a conventional joint cross universal joint, and illustrates the state of just the removed yoke.
Figure 11:
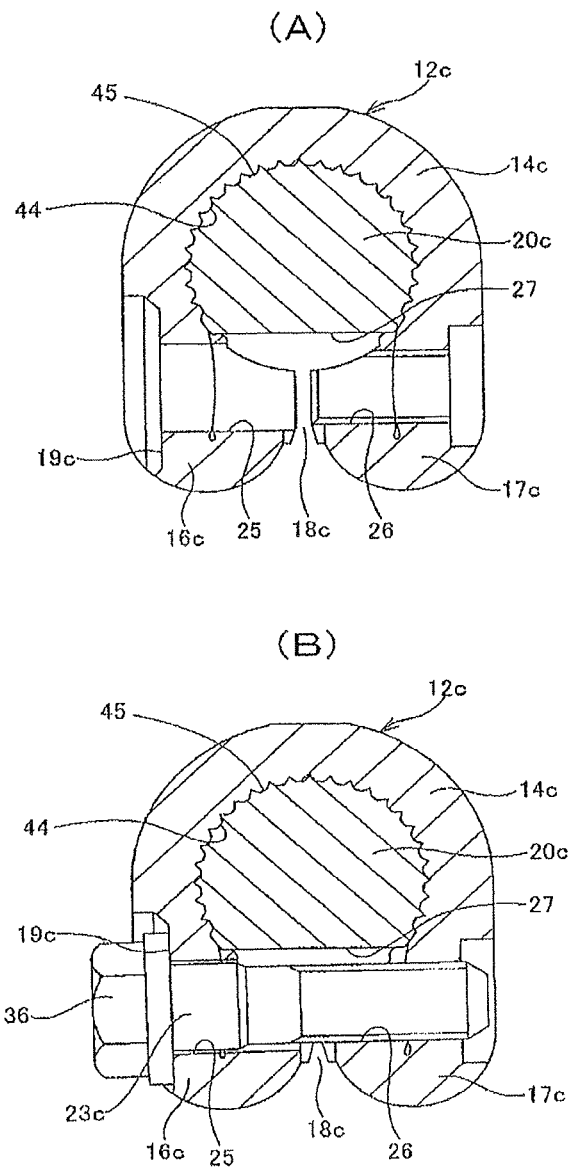
FIGS. 11(A) and 11(B) are diagrams of the yoke illustrated in FIG. 10, and correspond to cross-section I-I in FIG. 9, where
Figure 12:
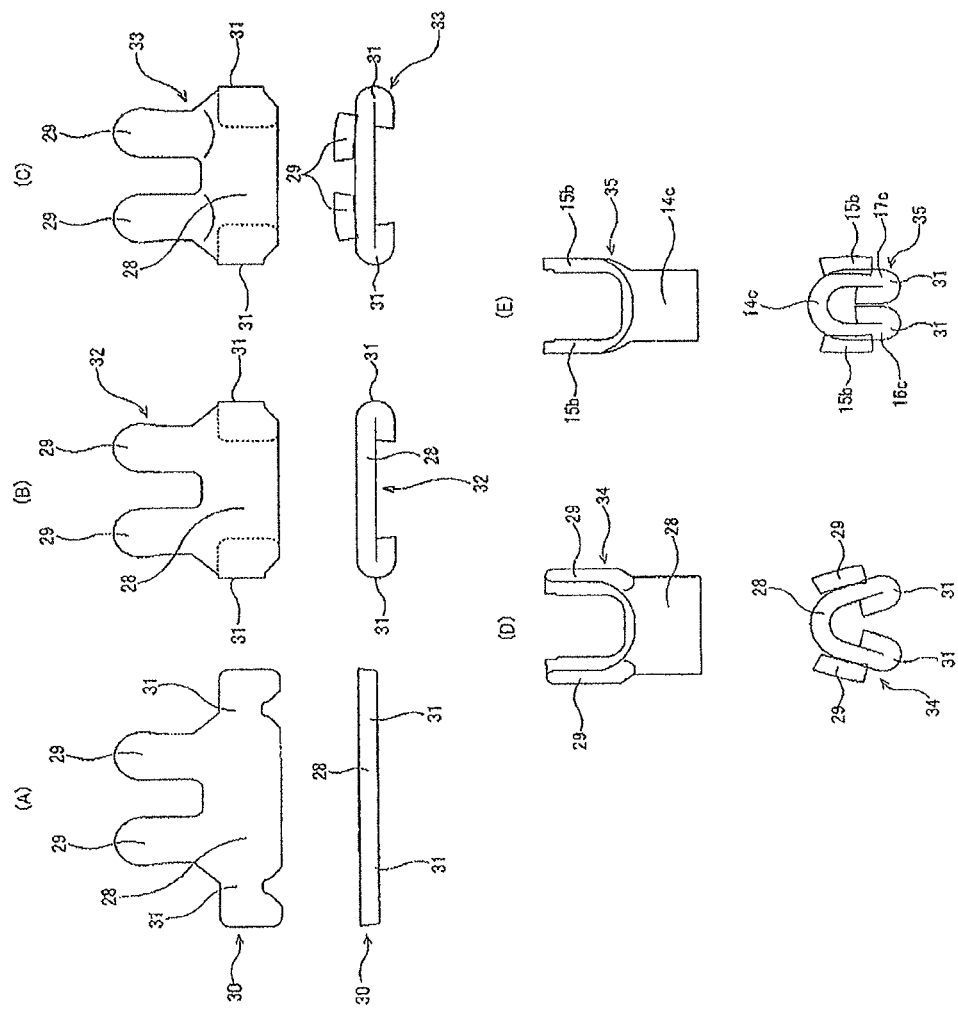
FIG. 12 is a diagram illustrating the order of processing in a method for manufacturing the yoke illustrated in FIG. 10.
Figure 13:
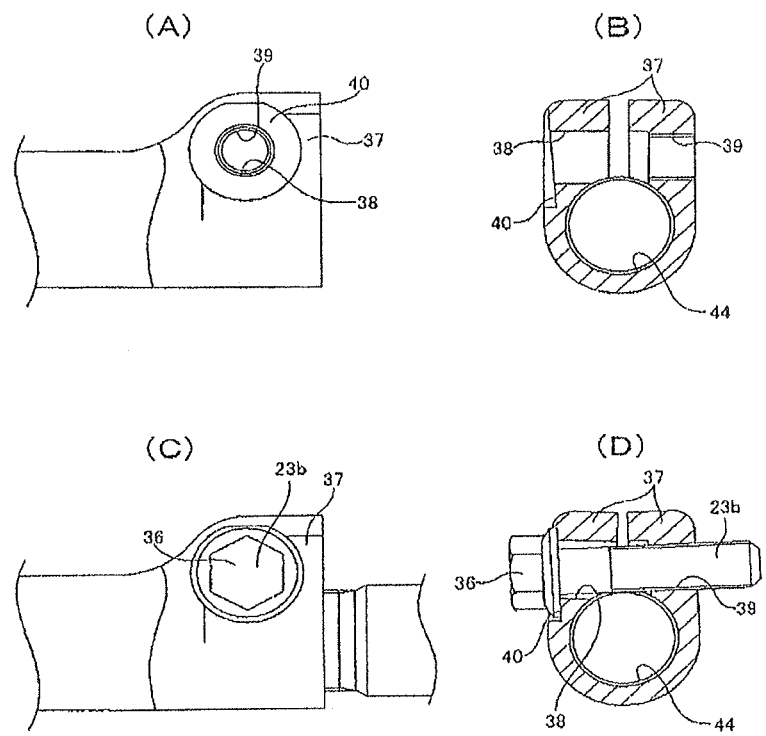
FIGS. 13(A) to 13(D) illustrate a third example of a conventional joint cross universal joint with just the yoke removed, where

The basic construction of the yoke 12d is the same as the conventional construction of the yoke 12c illustrated in FIGS. 10 and 11. Moreover, the construction and function of the overall universal joint are the same as that of the universal joint 11 having conventional construction as illustrated in FIG. 9. Furthermore, in regards to the manufacturing method of the yoke 12d, the basic processed sections, unless specially mentioned, are the same as in the conventional manufacturing method illustrated in FIG. 12. Therefore, for parts that are the same as in the conventional construction and conventional manufacturing method, any redundant figures and explanations will be omitted or simplified such that the explanation centers on the features of this example.

In the manufacturing method of this example, the work of forming the through hole 25, screw hole 26 and seating surface section 19d in the first and second flange sections 16d, 17d is performed with the inner diameter of the base section 14d of the yoke 12d in the reduced state.

The inner diameter of this base section 14d (the pitch circle diameter of the female serrations 44), in the state before the yoke 12d and the end section of the rotating shaft 20c are joined and fastened together, must be just a little larger than the outer diameter of the end section of the rotating shaft 20c (pitch circle diameter of the male serrations 45). This is necessary in order to enable the work of inserting the end section of the rotating shaft 20c into the base section 14d. In this state, the width dimension of the non-continuous section 18d that exists between the first and second flange sections 16d, 17d becomes wide.

In the manufacturing method of this example, as illustrated by the arrows in reverse directions from each other in FIG. 1(A), a force F is applied to the tip end sections of the first and second flange sections 16d, 17d in a direction toward each other. By reducing the width dimension of the non-continuous section 18d, the inner diameter of the base section 14d is elastically reduced. More specifically, the inner diameter of the base section 14d is elastically reduced until the pitch circle diameter of the female serrations 44 that are formed around the inner peripheral surface of the base section 14d nearly matches the pitch circle diameter of the male serrations formed around the outer peripheral surface of the end section of the rotating shaft 20. In other words, the width of the non-continuous section 18d is reduced until the base section 14d and end section of the rotating shaft 20 are in a state capable of being fastened, or until the end section of the rotating shaft 20c that is inserted inside the base section 14d is held with sufficient strength.

The through hole 25, screw hole 26 and seating surface section 19d are formed with the force F still applied. When doing this, the through hole 25 and screw hole 26 are processed concentric with each other, and the seating surface section 19d is formed in a direction orthogonal to the center axis of these holes 25, 26. It is not necessary to form the seating surface section 19d in a direction that is at an angle with respect to the center axis of the holes 25, 26, so the work of processing the seating surface section 19d and holes 25, 26 can be performed easily and with good precision.

After the through hole 25, screw hole 26 and seating surface section 19d have been formed, the force applied to the first and second flange sections 16d, 17d is released, and as illustrated in FIG. 1(B) and FIG. 2(A), the inner diameter of the base section 14d is elastically expands by its own elastic force. In other words, the width of the non-continuous section 18d expands and the inner diameter of the base section 14d expands to a size at which the end section of the rotating shaft 20 can be loosely inserted. More specifically, the pitch circle diameter of the female serrations 44 that are formed around the inner peripheral surface of the base section 14d becomes a little larger than the pitch circle diameter of the male serrations 45 that are formed around the outer peripheral surface of the end section of the rotating shaft 20c. In this state, the construction of the present invention in which the center axis of the through hole 25 and the center axis of the screw hole 26 are angled a little is obtained. The inner diameter of this through hole 25 is a little larger than the outer diameter of the bolt 23c, so that even though the holes 25, 26 are angled, the bolt can be inserted through the through hole 25 and screwed into the screw hole 26.

As illustrated in FIG. 2(B), in the construction of this example, when in the state of use in which the bolt 23c is screwed into the screw hole 26, and further tightened, and the yoke 12 and rotating shaft 20c are joined and fastened together, the seating surface section 19d is in nearly an orthogonal direction with respect to the center axis of the bolt 23c. In this state, it is possible to prevent a large force from being applied to the bolt 23c in the bending direction.

Moreover, in the manufacturing method of this example, processing of the through hole 25, screw hole 26 and seating surface sections 19d can be performed easily, so construction capable of easing bending of the bolt 23c when tightened can be obtained at low cost.

Example 2

FIGS. 3(A) and 3(B) illustrate a second example of the present invention. In this example, in the manufacturing process illustrated in FIGS. 12(A) to 12(E), in the stage of the fourth intermediate member 35 illustrated in FIG. 12(E), the inner diameter of the base section (pitch circle diameter of the female serrations 44) is nearly the same as the outer diameter of the end section of the rotating shaft 20c (pitch circle diameter of the male serrations 45). Also, in this state, the through hole 25, screw hole 26 and seating surface section 19d are formed in the first and second flange sections 16d, 17d. In this example as well, the through hole 25 and screw hole 26 are concentrically processed, and the seating surface section 19*d* is formed in a direction that is orthogonal to the center axis of the holes 25, 26, so the work of processing the seating surface section 19*d* and holes 25, 26 can be performed easily and with good precision.

After the through hole 25, screw hole 26 and seating surface section 19*d* have been formed, then as illustrated in FIG. 3(A), a wedge shaped diameter expanding jig 42 is pressed in between the first and second flange sections 16*d*, 17*d*. This expands the inner diameter of the base section 14*d* while plastically deforming the base section 14*d* a little. In other words, the width of the non-continuous section 18*d* that exists between the first and second flange sections 16*d*, 17*d* is expanded, the inner diameter of the base section 14*d* is expanded to a size at which the end section of the rotating shaft 20*c* can be loosely inserted, and the pitch circle diameter of the female serrations 44 that are formed around the inner peripheral surface of the base section 14*d* is made a little larger than the pitch circle diameter of the male serrations 45 that are formed around the outer peripheral surface of the end section of the rotating shaft 20. In this state, as in the first example, the center axis of the through hole 25 and the center axis of the screw hole 26 are angled a little.

Particularly, in this example, when forming the through hole 25 and screw hole 26, which requires a comparatively long processing time, there is no need to restrain the first and second flange sections 16*d*, 17*d*, so processing efficiency of the yoke 12*d* is improved, and is advantageous from the aspect of lowering the cost of the yoke 12*d*.

Example 3

Figure 4:
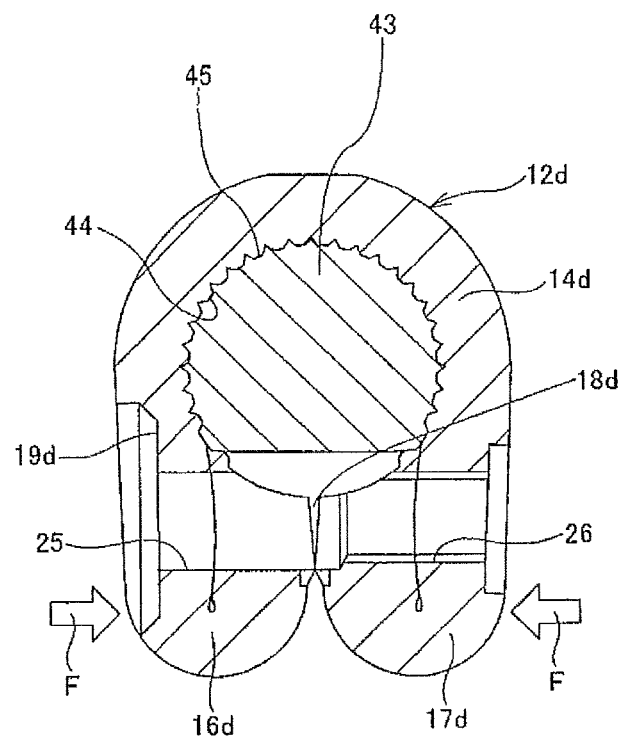
FIG. 4 is a diagram illustrating a third example of the present invention, and is the same as FIG. 1(A).

FIG. 4 illustrates a third example of the present invention. In this example, with a support shaft 43 having the same shape and dimensions as the end section of the rotating shaft 20 fitted inside the base section 14*d* in the place of the rotating shaft 20*c* that is to be joined and fastened to the base section 14*d* of the yoke 12*d*, a force F is applied to both the first and second flange sections 16*d*, 17*d* in directions toward each other, and the inner diameter of the base section 14*d* is elastically reduced. In doing so, with the inner diameter of the base section 14*d* reduced, the through hole 25, screw hole 26 and seating surface section 19*d* are formed in the first and second flange sections 16*d*, 17*d*.

In the case of this example, when forming the through hole 25, screw hole 26 and seating surface section 19*d*, the formation state of the base section 14*d* is closer to the actual state of use of the yoke 12*d*. Therefore, bending of the bolt 23*c* during use can be even further reduced.

Example 4

Figure 5:
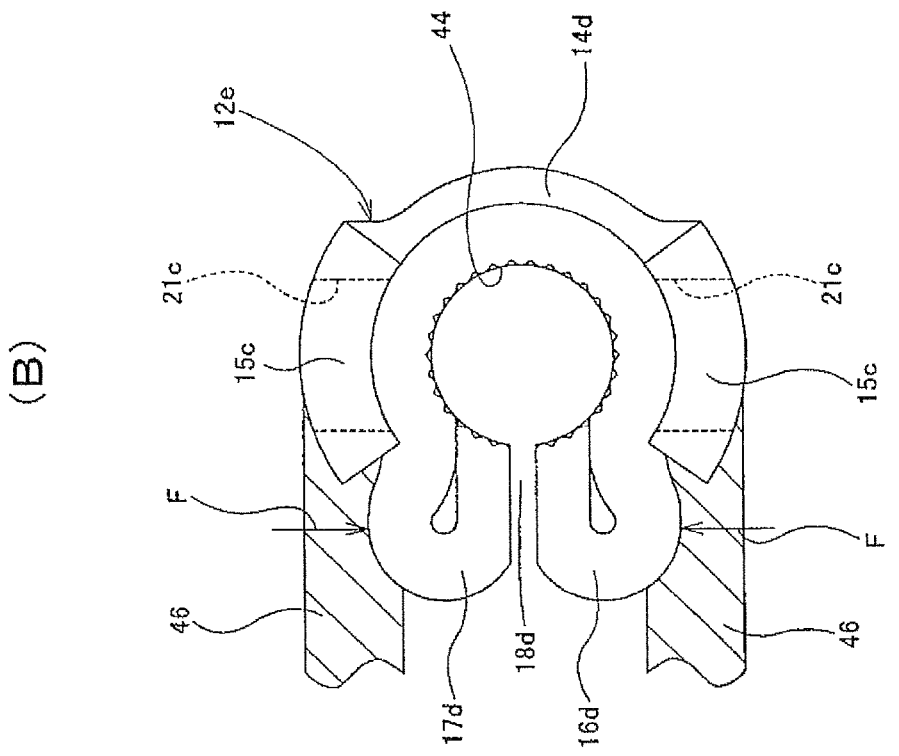
FIGS. 5(A) and 5(B) are diagrams of a fourth example of the present invention, where
Figure 5:
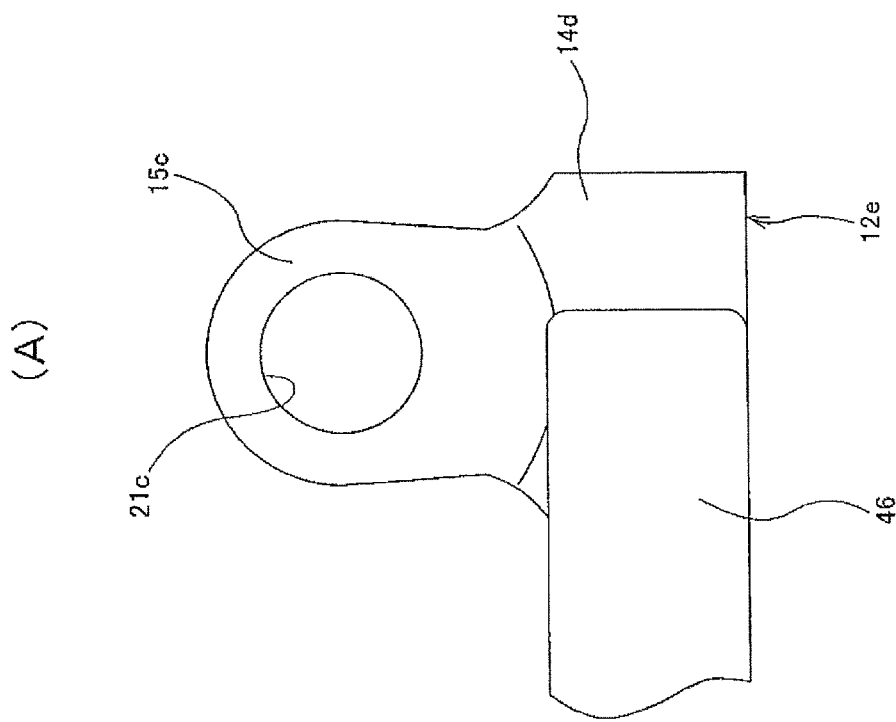

FIGS. 5(A) and 5(B) illustrate a fourth example of the present invention. In the case of the manufacturing method of this example, the work of forming the pair of circular hoes 21*c* in the tip end section of the pair of joint arm sections 15*c* of the yoke 12*e* is performed with the inner diameter of the base section 14*d* in the reduced state. In other words, when forming these circular holes 21*c*, a pair of restraining jigs 46 apply a force F to both of the first and second flange sections 16*d*, 17*d* in directions toward each other, causing the width of the non-continuous section 18*d* that exists between the first and second flange sections 16*d*, 17*d* to be reduced to a dimension at which the base section 14*d* and end section of the rotating shaft 20*c* can be fastened together. Also, in this state, the circular holes 21*c* are formed in the tip end sections of both joint arm sections 15*c* such that they are concentric with each other.

In the case of this example, by releasing the force F that is applied to both the first and second flange sections 16*d*, 17*d* after these circular holes 21*c* have been formed, the construction of this example is obtained in which the width of the non-continuous section 18*d* elastically expanded by its own elastic force, the inner diameter of the base section 14*d* is expanded to a size at which the end section of the rotating shaft 20*c* can be loosely inserted, and the center axes of the circular holes 21*c* are at an angle with respect to each other. In the case of this example, the work of forming the through hole 25, screw hole 26 and seating surface section 19*d* in the first and second flange sections 16*d*, 17*d* is performed before or after the formation of the circular holes 21*c* by the same method as in the first or third example of the invention.

In the yoke for a joint cross universal joint of this example as well, with the bolt 23*c* screwed into the screw hole 26 and further tightened, and the yoke 12*e* and rotating shaft 20*c* joined and fastened in the state of use, the center axes of the circular holes 21*c* that are formed in the tip end sections of both joint arm sections 15*c* are nearly matched with each other. Therefore, the two shaft sections of the joint cross can be arranged with good concentricity inside the circular holes by way of drawn cup needle bearings. Consequently, the rolling contact between the rolling surfaces of the needles of each drawn cup needle bearing and the raceway surfaces is good. As a result, together with lengthening the life of the drawn cup needle bearings, it is possible to make the rotation transmission operation of the joint cross universal joint smoother. The other construction and function are the same as in the first or third examples of the invention.

In the case of this example, the work of forming the through hole 25, screw hole 26 and seating surface section 19*d* in the first and second flange sections 16*d*, 17*d*, and the work of forming the circular holes 21*c* in the tip end sections of both joint arm sections 15*c* can be sequentially performed using a common jig, with the width of the non-continuous section 18*d* elastically reduced, or can be performed using separate jigs, and in each case, with the width of the non-continuous section 18*d* elastically reduced. In any case, the jig used for elastically reducing the width of the non-continuous section 18*d* is shaped such that it does not interfere with the formation work at each location 25, 26, 19*d*, 21*c*. Moreover, the method of forming the circular holes of this example can also be performed with the yoke 12*d* of the second example of the invention as the object.

Example 5

FIGS. 6(A) and 6(B) illustrated a fifth example of the present invention. In the case of the manufacturing method of this example, the work of forming female serrations 44*a* around the inner peripheral surface of the base section 14*e* of the yoke 12*f* is performed with the inner diameter of the base section 14*e* in the reduced state. Therefore, as illustrated in FIG. 6(A), in this example, first, as in the first example of the present invention, a force F is applied to both the first and second flange sections 16*d*, 17*d* in a direction toward each other by a pair of restraining jigs 46*a*, 46*b*, which causes the width of the non-continuous section 18*d* that exists between the first and second flange sections 16*d*, 17*d* to become narrower and reduced to a dimension at with the base section 14 and end section of the rotating shaft 20*c* can be fastened.

In this state, as illustrated in FIGS. 6(A) and 6(B), the through hold 25, screw hole 26 and seating surface section 19d are formed in the first and second flange sections 16d, 17d. After that, while maintaining the same state, as illustrated in FIG. 6(B), female serrations 44a are formed around the inner peripheral surface of the base section 14e. Particularly, in the case of this example, with the female serrations 44a formed in this way, the pitch circle diameter of the female serrations 44a is made a specified amount, more specifically, about 10 to 200 μm smaller than the pitch circle diameter of the male serrations 45 that are formed around the end section of the rotating shaft 20c.

Moreover, in the case of this example, after the female serrations 44a have been formed, by releasing the force F that is applied to both the first and second flange sections 16d, 17d, the width of the non-continuous section 18d elastically expands by its own elastic force, and as the inner diameter of the base section 14e becomes a size at which the end section of the rotating shaft 20c can be loosely inserted, the pitch circle diameter of the female serrations 44a becomes larger than the pitch circle diameter of the male serrations 45, and the construction of this example is obtained.

In the yoke for a joint cross universal joint of this example, with the width of the non-continuous section 18d in a narrow state and reduced to a dimension at with the base section 14e and end section of the rotating shaft 20c can be fastened, it is possible to make the shape and dimension of the female serrations 44a the desired shape and dimension. Therefore, when the bolt 23c is screwed into the screw hole 26 and further tightened, and the yoke 12f and rotating shaft 20c are joined and fastened in the state of use, the fit between the female serrations 44a and the male serrations 45 can be improved in a nearly uniform state overall.

Particularly, in the case of this example, with the female serrations 44a formed, the pitch circle diameter of the female serrations 44a is about 10 to 200 μm smaller than the pitch circle diameter of the male serrations 45. Therefore, in the state of use, it becomes easy to improve the fit between both serrations 44a, 45 in a nearly uniform state overall. As a result, it is possible to sufficiently maintain the joint force between the base section 14e and the end section of the rotating shaft 20c. The other construction and function are the same as those of the first example of the invention.

In this example, after the work of forming the through hole 25, screw hole 26 and seating surface section 19d in the first and second flange sections 16d, 17d has been performed, the work of forming the female serrations around the inner peripheral surface of the base section 14e is performed, however, the order of this formation work can be reversed. Moreover, in this example, a method was employed in which a common jig was used in both formation work, and the work was sequentially performed with the width of the non-continuous section 18d maintained in the narrow state, however, it is also possible to perform both formation work using different jigs, and to perform each with the width of the non-continuous section 18d maintained in the narrow state. Furthermore, the method used for forming the female serrations of this example can also be performed on the yoke 12d of the second example of the invention as the object.

Example 6

Figure 7:
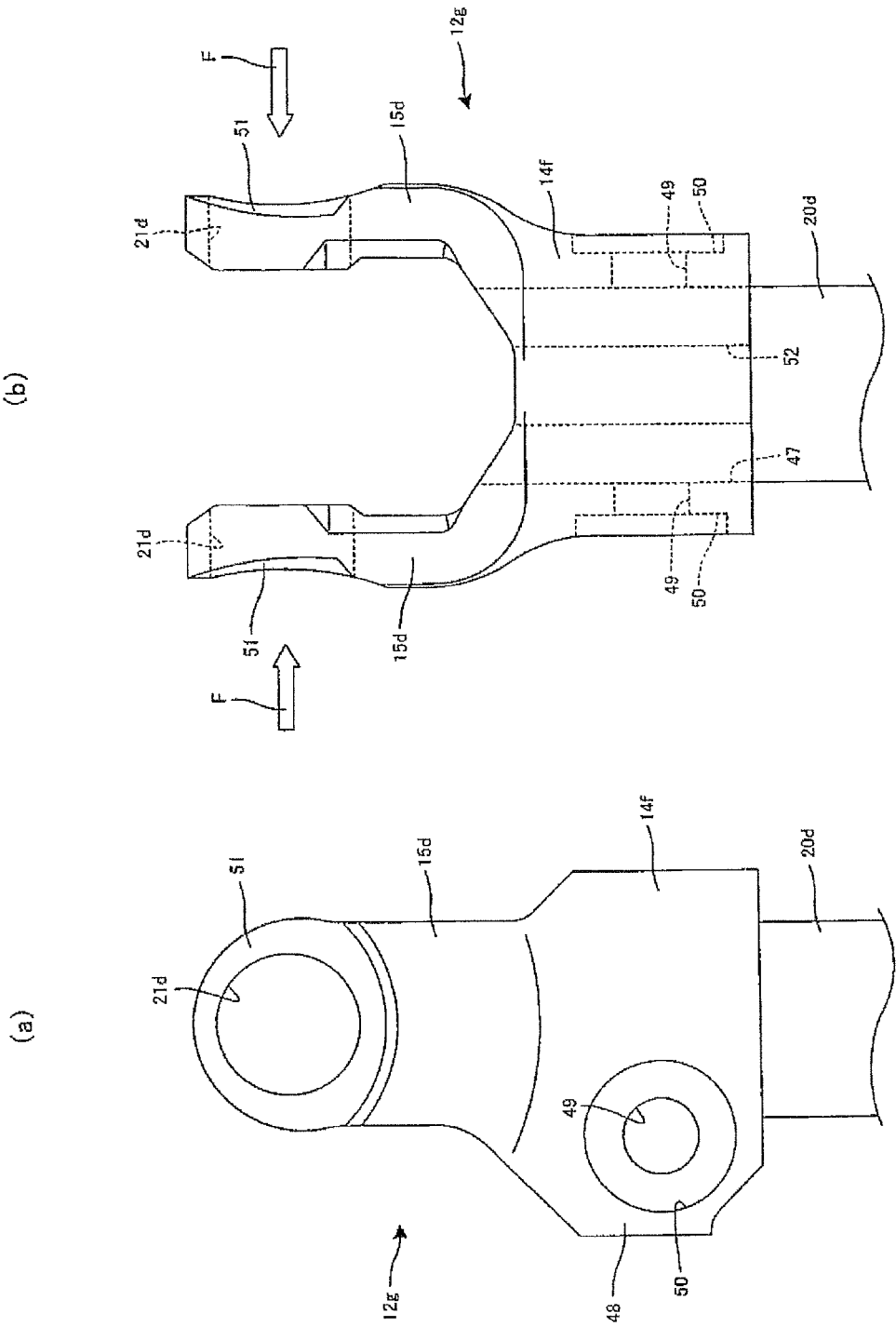
FIGS. 7(A) and 7(B) illustrate a sixth example of one preferred embodiment of the present invention, where
Figure 8:
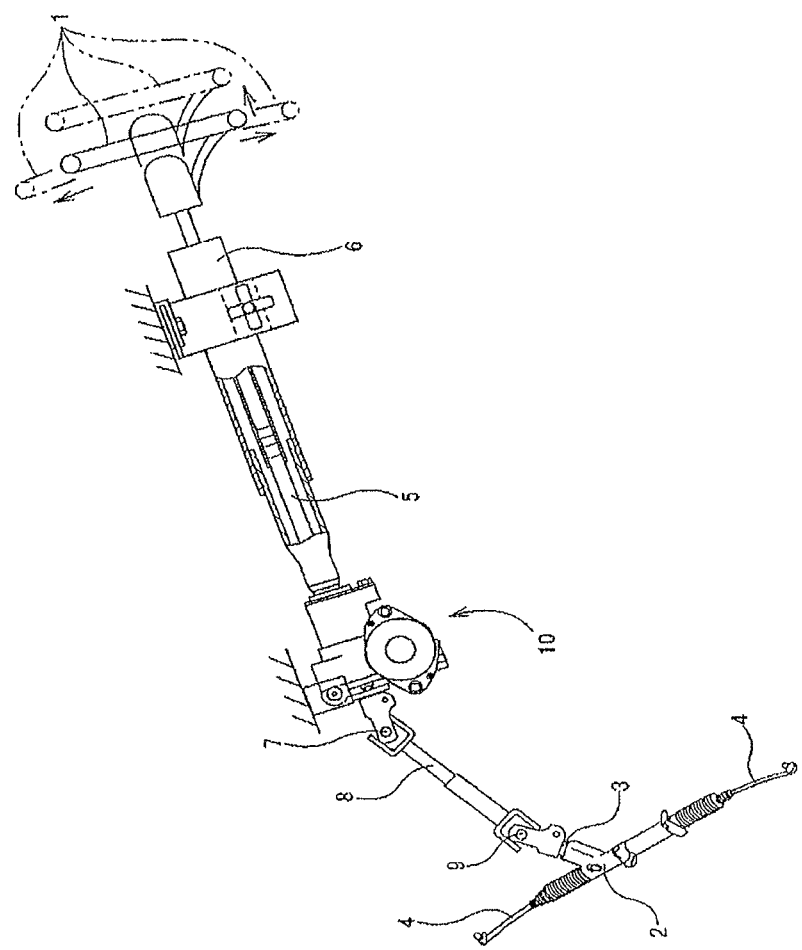
FIG. 8 is a partial cross-sectional side view illustrating an example of an automobile steering apparatus in which a cross universal joint is assembled.

FIGS. 7(A) and 7(B) illustrate a sixth example of the present invention. As illustrated in FIGS. 7(A) and 7(B), a pair of joint arm sections 15d is formed on the top side (top side in FIGS. 7(A), 7(B)) of the yoke 12g such that they face each other, and circular holes 21d are formed in each of these joint arm sections 15d. A joint cross bearing unit is inserted into the circular holes 21d by way of drawn cup needle bearings. The yoke 12g undergoes sequential punching and bending of the 8 mm thick metal plate by a press in order keep the length of the circular holes 21d long and increase the surface area of the circular holes 21d.

A cylindrical shaped base section 14f is formed on the bottom side (bottom side in FIGS. 7(A), 7(B)) of the yoke 12g, and a shaft 20d is inserted in this base section 14f such that it is parallel with the axial direction of the base section 14f. Moreover, a pair of left and right flange sections 48 is formed on the base section 14f of the yoke 12d so that they extend in the tangential direction from the base section 14f. A non-continuous section (slit) 52 that communicates with the inner peripheral surface 47 is formed between the pair of flange sections 48. The non-continuous section 52 is formed along the entire length in the axial direction of the base section 14f.

Bolt holes 49, though which a bolt 23 (not illustrated in the figure) is inserted, are formed in both flange sections 48 such that they are concentric with each other. Moreover, seating surface sections 50 are formed in both flange sections 48. The seating surface section 50 on the left side of FIG. 7(B) comes in contact with the bottom surface of the head section 36 of the bolt 23. The seating surface section 50 on the right side of FIG. 7(B) comes in contact with the bottom surface of a nut (not illustrated in the figure) that screws onto the shaft portion of the bolt 23.

The shaft 20d is inserted into the inner peripheral surface 47 of the base section 14f, and the bolt 23 is inserted through the bolt holes 49 from the left side in FIG. 7(B). When the nut is screwed onto the shaft section of the bolt 23, the flange sections 48 elastically deform and the channel width of the non-continuous section 52 becomes narrow, so the outer peripheral surface around the shaft 20d can be tightly fastened to the inner peripheral surface 47 of the base section 14f.

A cylindrical shaped press punch (not illustrated in the figure) presses the outside surface 51 in the radial direction of the pair of join arm sections 15d inward in the radial direction (direction of arrows F in FIG. 7(B)), to work harden the edge of the circular holes 21d. By doing so, the rigidity of the edge around the circular holes 21d in the pair of joint arm sections 15d increases, so as to support the large loads applied to the yoke 12g of the universal joint 7.

The rigidity of the joint arm sections 15d can be increased by pressing with a press, so it is possible to reduce the number of machining processes. Furthermore, there is no need for a cylindrical build up that protrudes to the outside in the radial direction as was done conventionally, so it is possible to reduce the diameter of the space in which the universal joint 7 swings around (swing circle), and thus it is possible to reduced the installment space of the universal joint that uses this yoke 12g.

After rough processing of the circular holes 21d by turning or the like, it is preferred that finishing be performed by roller burnishing. By doing so, the inner peripheral surface of the circular holes 21d are hardened, and roundness and plane roughness of the inner peripheral surface of the circular holes 21d are improved, so the durability and precision of the universal joint are further improved.

In this example, an example of applying the example to a pinch bolt type universal joint in which the rotating shaft 21d is joined to the base section 14f by tightening a bolt was explained, however, this example can also be applied to universal joints in which the rotating shaft 21d is joined to the base section 14f by welding or swaging.

INDUSTRIAL APPLICABILITY

Figure 2:
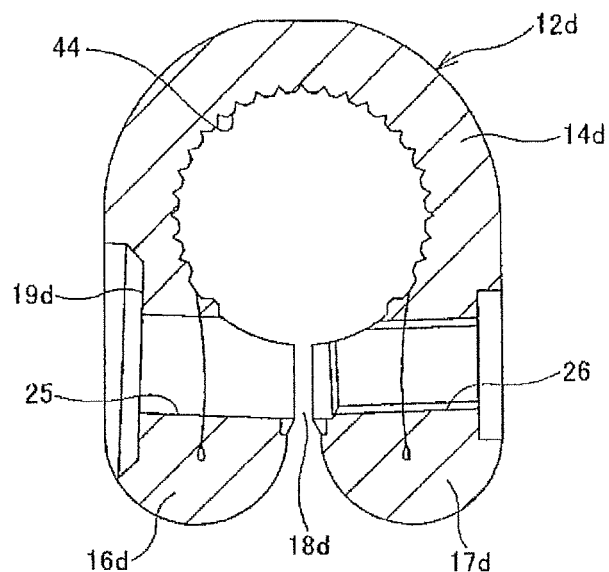
FIGS. 2(A) and 2(B) are diagrams of a first example of the present invention and are the same as FIGS. 1(A) and 1(B), where
Figure 2:
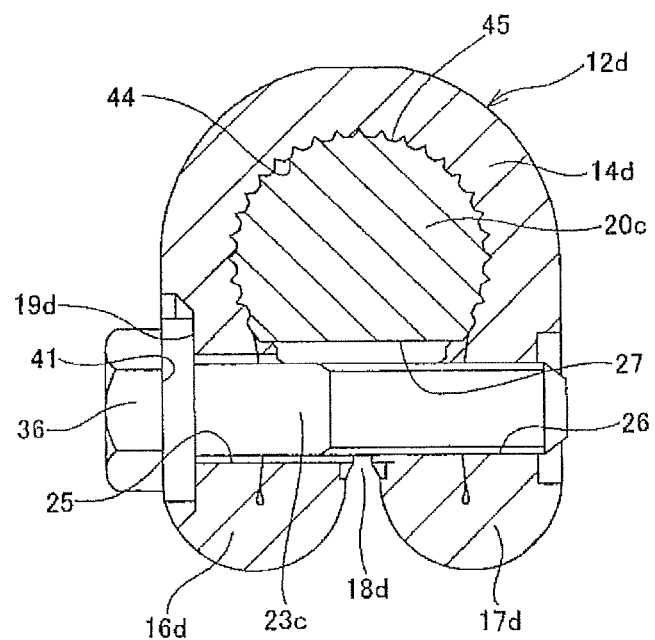
Figure 3:
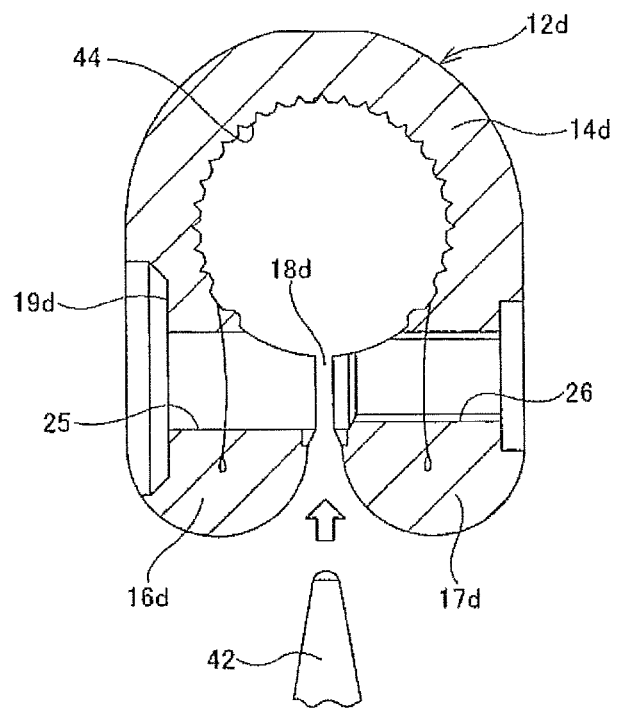
FIGS. 3(A) and 3(B) are diagrams of a second example of the present invention, and correspond to cross-section I-I in FIG. 9, where
Figure 3:
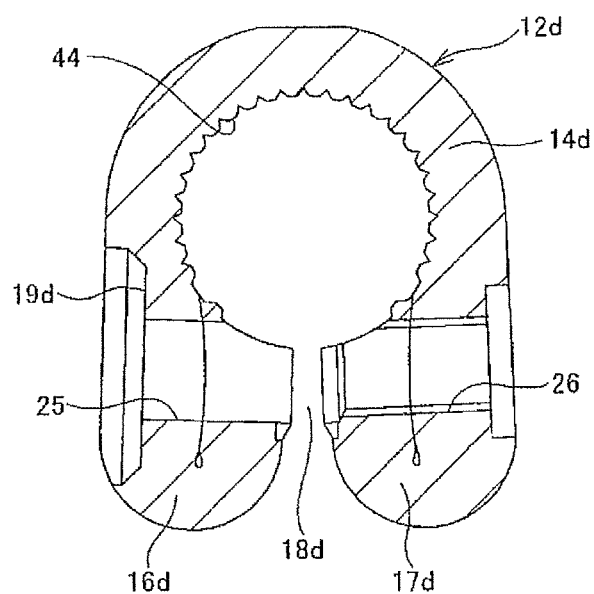
Figure 6:
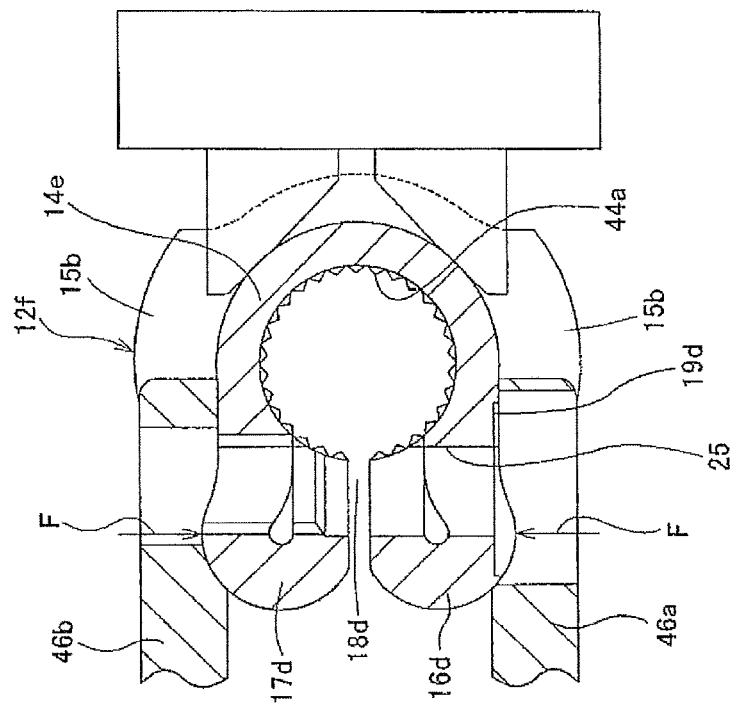
FIGS. 6(A) and 6(B) are diagrams of a fifth example of the present invention, and correspond to cross-section I-I in FIG. 9, where
Figure 6:
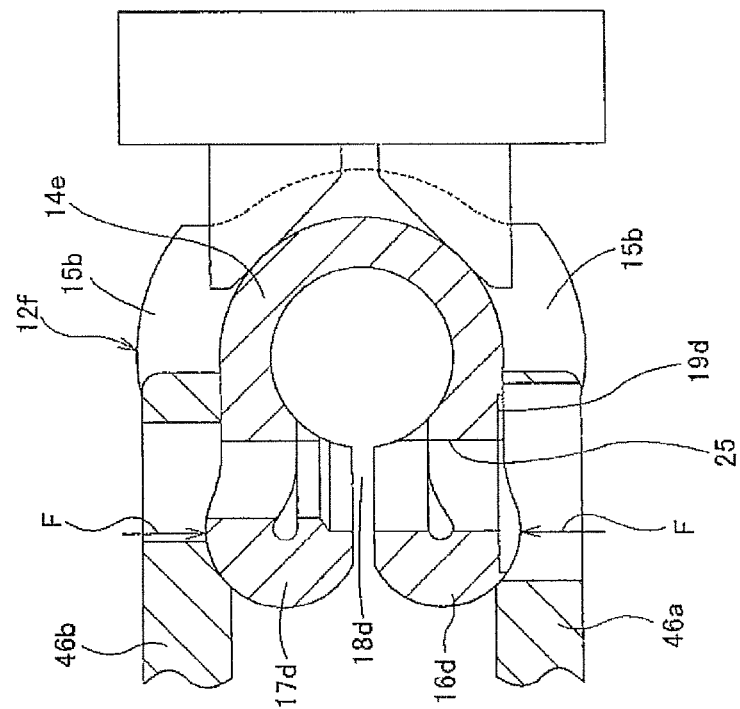

The present invention is not limited to a yoke 12d as illustrated in FIGS. 1 to 3 that is made by pressing metal plate to form first and second flange sections 16d, 17d having a thickness equal to two metal plates. In other words, the invention can also be applied to a yoke 12b such as illustrated in FIG. 6 that is made by forming first and second flange sections 16b, 17b that only have the thickness of one metal plate. Furthermore, the invention can be applied to a yoke that is made by forging.

Moreover, Each of the present invention related to the construction and formation method of the pair of circular holes illustrated in the example 4, and the present invention related to the construction and formation method of the female serrations illustrated in the example, can function uniquely and produce a separate effect, even when these inventions are applied to a yoke for a cross type universal joint in which through holes are formed in both first and second flange sections, which are conventionally known, such as disclosed in Patent Document 8.

EXPLANATION OF REFERENCE NUMBERS

1 Steering wheel
2 Steering gear unit
3 Input shaft
4 Tie rod
5 Steering shaft
6 Steering column
7 Universal joint
8 Intermediate shaft
9 Universal joint
10 Assist apparatus
11 Universal joint
12a, 12b, 12c, 12d, 12e, 12f, 12g Yoke
13 Joint cross
14a, 14b, 14c, 14d, 14e, 14f Base section
15a, 15b, 15c, 15d Joint arm section
16a, 16b, 16c, 16d First flange section
17a, 17b, 17c, 17d Second flange section
18a, 18b, 18c, 18d Non-continuous section
19a, 19b, 19c, 19d Seating surface section
20a, 20b, 20c, 20d Rotating shaft
21a, 21b, 21c, 21d Circular hole
22a, 22b Radial bearing
23, 23a, 23b Bolt
24a, 24b Nut
25 Through hole
26 Screw hole
27 Notch section
28 Base plate section
29 Tongue-shaped section
30 Raw plate
31 Narrow width section
32 First intermediate material
33 Second intermediate material
34 Third intermediate material
35 Fourth intermediate material
36 Head section
37 Flange section
38 Through hole
39 Screw hole
40 Seating surface section
41 Inside surface
42 Diameter expanding jig
43 Support shaft
44, 44a Female serrations
45 Male serrations
46, 46a, 46b Restraining jigs
47 Inner peripheral surface
48 Flange section
49 Bolt hole
50 Seating surface
51 Outside surface in the radial direction of the joint arm section
52 Non-continuous section (slit)

What is claimed is:

1. A yoke for a cross type universal joint comprising:
a base section for joining and fastening an end section of a rotating shaft;
a pair of joint arm sections extending from one end section in the axial direction of the base section at two locations on opposing sides in the radial direction with respect to the rotating shaft; and
a pair of circular holes formed in tip end sections of the pair of joint arm sections such that the circular holes are concentric with each other,
the base section being a partial cylinder having a non-continuous section at one location in the circumferential direction, and comprising:
a first flange section and a second flange section located on both sides of the non-continuous section;
a through hole formed in the first flange section at a skewed position with respect to a center axis of the base section;
a screw hole formed in the second flange section in a position that coincides with the through hole; and
a seating surface section formed in a portion on an outside surface of the first flange section surrounding the through hole, such that the seating surface section is oriented in a direction orthogonal to the through hole,
wherein
a center axis of the through hole and a center axis of the screw hole are angled with respect to each other in an expanded width state at which the width of the non-continuous section is expanded to a dimension at which the end section of the rotating shaft is loosely insertable inside the base section, and
the center axes of the through hole and screw hole are aligned with each other in a reduced width state at which the width of the non-continuous section is reduced to a dimension at which the base section and the end section of the rotating shaft are fastened to each other such that a bolt inserted through the through hole, screwed into the screw hole and tightened has a bolt head section inner surface parallel to the seating surface section of the first flange section portion.

2. The yoke for a cross type universal joint according to claim 1, wherein the center axis of the pair of circular holes formed in the tip end sections of the pair of joint arm sections are angled with respect to each other in the expanded width state, and the center axes of the pair of circular holes are aligned with each other in the reduced width state.

3. The yoke for a cross type universal joint according to claim 1, wherein female serrations are formed around the inner peripheral surface of the base section and fit with male serrations that are formed around the outer peripheral surface of the end section of the rotating shaft, and in the expanded width state a pitch circle diameter of the female serrations is larger than a pitch circle diameter of the male serrations, and in the reduced width state the pitch circle diameter of the female serrations tends to become the same as the pitch circle diameter of the male serrations, or tends to become a specified amount smaller than the pitch circle diameter of the male serrations.

4. A manufacturing method for manufacturing a yoke for a cross type universal joint, the yoke comprising:

a base section for joining and fastening an end section of a rotating shaft;

a pair of joint arm sections extending from one end section in the axial direction of the base section at two locations on opposing sides in the radial direction with respect to the rotating shaft; and a pair of circular holes formed in tip end sections of the pair of joint arm sections such that the circular holes are concentric with each other, the base section being a partial cylinder having a non-continuous section at one location in the circumferential direction, and comprising:

a first flange section and a second flange section located on both sides of the non-continuous section;

a through hole formed in the first flange section at a skewed position with respect to a center axis of the base section;

a screw hole formed in the second flange section in a position that coincides with the through hole; and a seating surface section formed in a portion on the outside surface of the first flange section surrounding the through hole, such that the seating surface is oriented in a direction orthogonal to the through hole, the manufacturing method comprising steps of:

reducing a width of the non-continuous section to a reduced width state at which the base section and the end section of the rotating shaft are fastenable to one another;

forming the through hole in the first flange section and the screw hole in the second flange section so that the holes are concentric with each other while in the reduced width state, forming the seating surface section in the portion on the outside surface of the first flange that surrounds the through hole such that the seating surface section is orthogonal to a center axis of the through hole, and then expanding the width of the non-continuous section located between the first flange and second flange to an expanded width state at which the inner diameter of the base section is expanded to a size at which the end section of the rotating shaft is loosely insertable inside the base section, wherein the center axis of the through hole and a center axis of the screw hole are angled with respect to each other in the expanded width state, and the center axes of the through hole and screw hole are aligned with each other in the reduced width state, the center axes of the through hole and screw hole are aligned with each other in the reduced width state in a bolted state that a bolt inserted through the through hole, screwed into the screw hole and tightened, and in the bolted state a bolt head section inner surface of the bolt is parallel to the seating surface section of the first flange section portion.

5. The manufacturing method for manufacturing a yoke for a cross type universal joint according to claim 4, wherein the through hole, screw hole and seating surface section are formed after a force is applied to both the first flange section and second flange section in a direction toward each other to reach the reduced width state, and the expanded width state is reached after release of the force applied to the first flange section and second flange section.

6. The manufacturing method for manufacturing a yoke for a cross type universal joint according to claim 5, wherein the force is applied with a support shaft having the same shape and dimension as the end section of the rotating shaft fitted inside the base section.

7. The manufacturing method for manufacturing a yoke for a cross type universal joint according to claim 4, wherein the through hole, screw hole and seating surface section are formed in the reduced width state, after which the first flange section and section flange section are plastically deformed in a direction away from each other to expand the inner diameter of the base section to reach the expanded width state.

8. The manufacturing method for manufacturing a yoke for a cross type universal joint according to claim 4, wherein the pair of circular holes are formed in the tip end sections of the pair of joint arm sections when in the reduced width state such that the pair of circular holes are concentric with each other.

9. The manufacturing method for manufacturing a yoke for a cross type universal joint according to claim 4, wherein the yoke for a cross type universal joint has female serrations formed around the inner peripheral surface of the base section that fit with male serrations that are formed around the outer peripheral surface of the end section of the rotating shaft; and wherein the female serrations are formed such that in the reduced width state the pitch circle diameter of the female serrations is the same as the pitch circle diameter of the male serrations, or is a specified amount smaller than the pitch circle diameter of the male serrations.

* * * * *